(12) United States Patent
Weber et al.

(10) Patent No.: US 10,783,767 B2
(45) Date of Patent: \*Sep. 22, 2020

(54) DEVICE AND METHOD FOR CONTROLLING BLUETOOTH ENABLED OCCUPANCY SENSORS

(71) Applicant: Hubbell Incorporated, Shelton, CT (US)

(72) Inventors: Theodore Weber, Round Rock, TX (US); Michael Muecke, Round Rock, TX (US); Terrence Arbouw, Georgetown, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,425

(22) Filed: Aug. 13, 2019

(65) Prior Publication Data

US 2019/0371156 A1 Dec. 5, 2019

Related U.S. Application Data

(63) Continuation of application No. 15/970,416, filed on May 3, 2018, now Pat. No. 10,380,870.

(Continued)

(51) Int. Cl.
*G08B 21/00* (2006.01)
*G08B 21/22* (2006.01)
(Continued)

(52) U.S. Cl.
CPC ............... *G08B 21/22* (2013.01); *G01V 8/10* (2013.01); *G01V 8/12* (2013.01); *H04L 12/282* (2013.01);
(Continued)

(58) Field of Classification Search
CPC .......... G01V 8/12; G08B 21/22; H04L 12/282
(Continued)

(56) References Cited

U.S. PATENT DOCUMENTS 5,986,357 A 11/1999 Myron
6,078,253 A 6/2000 Fowler
(Continued)

OTHER PUBLICATIONS

PCT/US2018/030890 International Search Report and Written Opinion dated Jul. 13, 2018 (10 pages).

*Primary Examiner* — Mark S Rushing
(74) *Attorney, Agent, or Firm* — Michael Best & Friedrich, LLP (57) ABSTRACT

Device and method for controlling Bluetooth™ enabled occupancy sensors. One example system includes a transceiver, a display, and an electronic processor. The electronic processor is configured to receive from an occupancy sensor, a plurality of occupancy data points and an occupancy threshold, and to generate a graphical representation based on the data points and the threshold. The graphical representation includes a first line providing an indication of the values of the plurality of the occupancy data points relative to the occupancy threshold over time. The electronic processor is configured to present the graphical representation on the display. The electronic processor is configured to receive a user input indicating an updated occupancy sensing value, generate, based on the graphical representation and the updated occupancy sensing value, an updated graphical representation, present, on the display, the updated graphical representation, and transmit, to the occupancy sensor, the updated occupancy sensing value.

16 Claims, 10 Drawing Sheets

Related U.S. Application Data

(60) Provisional application No. 62/501,911, filed on May 5, 2017.

(51) Int. Cl.
*H04L 12/28* (2006.01)
*G01V 8/12* (2006.01)
*G01V 8/10* (2006.01)
*F21V 23/04* (2006.01)

(52) U.S. Cl.
CPC ... *F21V 23/0471* (2013.01); *H04L 2012/2841* (2013.01)

(58) Field of Classification Search
USPC .................................................... 340/539.14
See application file for complete search history.

(56) References Cited

U.S. PATENT DOCUMENTS

| | | |
|---|---|---|
| 6,756,998 B1 | 6/2004 | Bilger |
| 7,027,355 B2 | 4/2006 | Baldwin et al. |
| 8,796,610 B2 | 8/2014 | Williams et al. |
| 9,357,620 B2 | 5/2016 | Primous et al. |
| 2004/0002792 A1 | 1/2004 | Hoffknecht |
| 2009/0193217 A1 | 7/2009 | Korecki et al. |
| 2012/0299728 A1 | 11/2012 | Kirkpatrick et al. |
| 2012/0310376 A1 | 12/2012 | Krumm et al. |
| 2016/0322817 A1 | 11/2016 | Baker |
| 2017/0270711 A1 | 9/2017 | Schoenberg |
| 2018/0113897 A1 | 4/2018 | Donlan |

BACK | SAVE | VIEW OCC DATA

OCC STATUS:

OCCUPIED

OCC EVENT COUNT:

255

REFRESH | CLEAR EVENTS

OCC TIMEOUT:
MINUTES

0

SECONDS

15

SENSITIVITY:

7

GROUPS
GROUPS

| 01 | 02 | 03 | 04 |
| 05 | 06 | 07 | 08 |
| 09 | 10 | 11 | 12 |

# DEVICE AND METHOD FOR CONTROLLING BLUETOOTH ENABLED OCCUPANCY SENSORS

CROSS-REFERENCE TO RELATED APPLICATIONS

The present application is a continuation of and claims the benefit of the filing date of co-pending U.S. patent application Ser. No. 15/970,416, filed May 3, 2018, which claims the benefit of U.S. Provisional Patent Application No. 62/501,911, filed May 5, 2017.

FIELD

Embodiments described herein relate to controlling room lighting and other electrical loads using occupancy sensors, and, more particularly, to control of occupancy sensors equipped with Bluetooth™ or other wireless communications capabilities.

SUMMARY

Occupancy sensors sense the presence of occupants in a designated area and activate an electrical load or system in response to sensing one or more persons in the designated area. An occupancy sensor may be connected to a lighting device or system, a heating, ventilation and air conditioning (HVAC) system, or other electrical system that is intended to be activated only when needed. Occupancy sensors sense occupancy using infrared or ultrasonic detectors, which can detect persons, moving objects, or both (e.g., an occupancy event). An occupancy sensor is typically mounted to a ceiling or wall and positioned such that a field of view of the sensor covers the designated area.

In lighting systems, occupancy sensors may be integrated into individual lighting fixtures or may be standalone units that communicate data regarding occupancy to other devices or lighting fixtures of the lighting systems.

Some occupancy sensors include user-configurable parameters to determine what indicates an occupancy event. Such parameters include an occupancy threshold for the sensor signal levels and an occupancy timer to determine when occupancy is no longer sensed. Some occupancy sensors include visual indicators (e.g., an LED), which can indicate when an occupancy event occurs. The visual indicator may be used to tune the performance of an occupancy sensor (e.g., by adjusting the parameters). However, visual indicators provide only a binary indication of occupancy and are thus limited in their effectiveness as tools for tuning occupancy sensors. Thus, embodiments described herein provide, among other things, systems and methods that provide access to the underlying data from an occupancy sensor to a remote computing device, which device may make adjustments to the parameters of the occupancy sensor.

For example, one embodiment provides a system. The system includes a transceiver, an input/output interface, a display, and an electronic processor. The electronic processor is configured to receive, via the transceiver, from an occupancy sensor, a plurality of occupancy data points and an occupancy threshold. The electronic processor is configured to generate a graphical representation based on the plurality of occupancy data points and the occupancy threshold. The graphical representation includes a first line providing an indication of the values of the plurality of the occupancy data points relative to the occupancy threshold over time. The electronic processor is configured to present the graphical representation on the display. The electronic processor is configured to receive a user input indicating an updated occupancy sensing value, and generate, based on the graphical representation and the updated occupancy sensing value, an updated graphical representation. The electronic processor is configured to present, on the display, the updated graphical representation and transmit, via the transceiver to the occupancy sensor, the updated occupancy sensing value.

Another embodiment provides a method. The method includes receiving, from an occupancy sensor, a plurality of occupancy data points and an occupancy threshold. The method includes determining, with an electronic processor, based on the plurality of data points and the occupancy threshold, a first occupancy event when a subset of the plurality of data points exceeds the occupancy threshold. The method includes determining, based on the first occupancy event, an occupancy tinier. The method includes generating a graphical representation based on the plurality of occupancy data points, the occupancy threshold, the first occupancy event, and the occupancy timer. The graphical representation includes a first line providing an indication of the values of the plurality of the occupancy data points relative to the occupancy threshold over time, a second line providing an indication of the first occupancy event, and a third line providing an indication of the occupancy timer. The method includes presenting the graphical representation on a display communicatively coupled to the electronic processor. The method includes receiving a user input indicating an updated occupancy sensing value. The method includes generating, based on the graphical representation and the updated occupancy sensing value, an updated graphical representation. The method includes presenting, on the display, the updated graphical representation. The method includes transmitting, to the occupancy sensor, the updated occupancy sensing value.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present

DETAILED DESCRIPTION

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
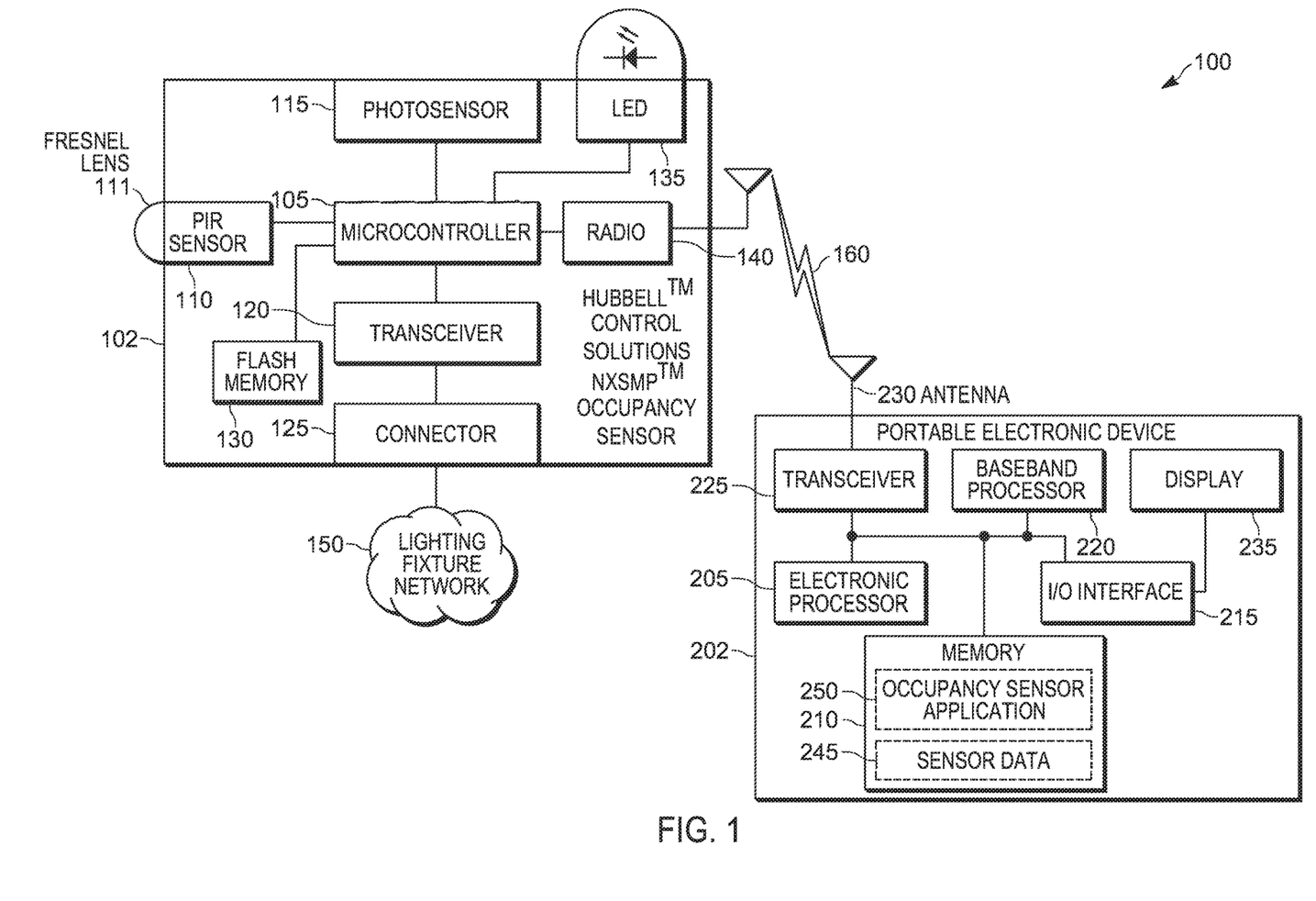
FIG. 1 schematically illustrates alighting control system, according to some embodiments.

FIG. 1 illustrates a lighting control system 100. The lighting control system 100 includes an occupancy sensor 102 and a portable electronic device 202. In some embodiments, the occupancy sensor 102 is communicatively coupled to and participates in a lighting fixture network 150. The occupancy sensor 102 may be operated in an indoor or outdoor environment—mounted to a lighting fixture, a pole, a building, or other structure—to detect occupants. The occupancy sensor 102 is communicatively coupled to the portable electronic device 202 via a communications link 160. In some embodiments, the communications link 160 is a Bluetooth™ link. In some embodiments, the communications link 160 is accomplished indirectly via one or more wireless or wired networks.

The occupancy sensor 102 includes a microcontroller 105, a passive infrared (PIR) sensor 110, a photo sensor 115, a transceiver 120, a connector 125, a flash memory 130, an LED 135, and a radio 140. The illustrated components of the occupancy sensor 102, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

In some embodiments, the microcontroller 105 is comprised of one or more generic or specialized electronic processors (for example, microprocessors, digital signal processors, customized processors and field programmable gate arrays (FPGAs). The microcontroller includes stored program instructions (including both software and firmware) that control the microcontroller to implement, in conjunction with other circuits and components, the functions described herein. Alternatively, in some embodiments, some or all of the functions of the microcontroller 105 are implemented by a state machine that has no stored program instructions, or in one or more application specific integrated circuits (ASICs). In some embodiments, a combination of the two approaches could be used. In some embodiments, the microcontroller 105 stores and retrieves data, including program instructions and configuration data, to and from the flash memory 130. The flash memory 130 is conventional, and will not be described in detail.

The PIR sensor 110 is an electronic Passive InfraRed sensor that measures infrared (IR) light radiating from objects in its field of view. The PIR sensor is covered by a KR lens 111. In the embodiment illustrated the PIR lens is a Fresnel lens. The optical characteristics of the PIR lens 111 determine, among other things, the field of view for the PIR sensor 110. In some embodiments, the passive infrared (PIR) sensor 110 and PIR lens 111 are mounted directly to or on the occupancy sensor 102. In some embodiments, they may be integrated into the occupancy sensor 102 extend through housing of the occupancy sensor 102.

Using readings from the PIR sensor 110, the microcontroller 105 is able to detect motion in the designated area, and thus determine whether the area is occupied or unoccupied. The PIR sensor 110 detects changes in the amount of infrared radiation reaching it through the PIR lens 111, which radiation varies depending on the temperature and surface characteristics of the objects in the field of view of the sensor. When a person passes in front of the background, such as a wall, the temperature at that point in the sensor's field of view rises from room temperature to body temperature, and then back again. The sensor converts the resulting change in the incoming infrared radiation into a change in the output voltage, which is fed to the microcontroller 105. In some embodiments, the PIR sensor 110 includes an integrated analog-to-digital converter, which converts the output voltage to a serial digital stream of motion data that is sent to the microcontroller 105. In some embodiments, the microcontroller 105 digitizes the output voltage according to a predetermined sample rate to produce a series of occupancy data points. In some embodiments, the microcontroller 105 arranges the resulting data points into a sequential time series based on timestamps and aggregates the occupancy data points into data bins of a determined size (that is, a length of time). The bin (or window) size for the occupancy data points varies depending on the desired level of data granularity.

When the occupancy data exceeds an occupancy threshold, and this triggers an occupancy detection (or an occupancy event). In some embodiments, the microcontroller 105 may activate an electrical load (not shown) in response to the occupancy event. In other embodiments, the microcontroller 105 communicates the occupancy event to other devices on the lighting fixture network 150, which take action based on the occupancy event. In some embodiments, the microcontroller 105 controls a load directly and communicates with other devices. In some embodiments, the microcontroller 105 starts an occupancy timer when an occupancy event occurs. Each time an occupancy event occurs, the microcontroller 105 restarts the timer. When no subsequent occupancy events are detected to restart the timer, the timer expires. When the occupancy timer expires, the microcontroller 105 determines that the room is unoccupied. When microcontroller 105 determines that there is no occupancy, it may deactivate an electrical load, communicate the occupancy status to other devices, or both. The non-occupancy threshold and the occupancy timer are both user-configurable.

The photo sensor 115 senses ambient light in the area of the occupancy sensor 102 and communicates signals representative of the ambient light levels to the microcontroller 105. In some embodiments, the microcontroller 105 controls the activation or brightness level of lighting fixtures based on the ambient light levels to improve energy efficiency. For example, when ambient light levels are fifty percent of the desired light level, the microcontroller 105, upon an occupancy event, activates a lighting fixture at fifty percent of full brightness to reduce the energy usage of the lighting fixture while still achieving the desired light levels. In some embodiments, the microcontroller 105 communicates the ambient light levels to other devices on the lighting fixture network 150, which may control their loads based on the ambient light levels.

The microcontroller 105 communicates to other devices on the lighting fixture network 150 via the transceiver 120 and connector 125. The transceiver 120 is communicatively coupled to the microcontroller 105 (e.g., via an integrated serial or I/O port) and is configured to send and receive communications on one or more buses using a suitable protocol. In some embodiments, the transceiver 120 is an RS-485 transceiver and the connector 125 is an RJ-45 connector. In such embodiments, microcontroller 105 is communicatively coupled to the lighting fixture network 150 over an external bus that operates using the RS-485 serial communication standard and includes one or more conductors connecting the devices of the lighting fixture network 150 in a daisy chain or multi-drop configuration. The microcontroller 105 sends and receives data to and from the devices of the lighting fixture network 150 via the transceiver 120 and the lighting fixture network 150.

The LED 135 is a light-emitting diode mounted such that it can emit light to an observer of the occupancy sensor 102. In some embodiments, the microcontroller 105 activates the LED 135 during an occupancy event to indicated to installers or other users that the occupancy sensor 102 is detecting an occupancy event. The LED 135 may thus be used to facilitate installation, placement, and testing of the occupancy sensor 102.

The radio 140 enables the microcontroller 105 to communicate with, among other devices, the portable electronic device 202. In some embodiments, the radio 140 implements Bluetooth™, Wi-Fi™, or another wireless communications protocol that allows communication with the portable electronic device 202.

In the embodiment illustrated, the portable electronic device 202 includes an electronic processor 205, a memory 210, an input/output interface 215, a baseband processor 220, a transceiver 225, an antenna 230, and a display 235. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, sensor data 245 and an occupancy sensor application 250 (described in detail below).

The input/output interface 215 is configured to receive input and to provide output to peripherals. The input/output interface 215 obtains information and signals from, and provides information and signals to, (for example, over one or more wired and/or wireless connections) devices both internal and external to the portable electronic device 202.

The electronic processor 205 is configured to control the baseband processor 220 and the transceiver 225 to transmit and receive video and other data to and from the portable electronic device 202. The baseband processor 220 encodes and decodes digital data sent and received by the transceiver 225. The transceiver 225 transmits and receives radio signals to and from various wireless communications networks using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225. In some embodiments, the baseband processor implements Bluetooth™, Wi-Fi™, or another wireless communications protocol that allows communication with the occupancy sensor 102.

The display 235 is a suitable display such as, for example, a liquid crystal display (LCD) touch screen, or an organic light-emitting diode (OLED) touch screen. The portable electronic device 202 implements a graphical user interface (GUI) (for example, generated by the electronic processor 205, from instructions and data stored in the memory 210, and presented on the display 235), that enables a user to interact with the portable electronic device 202.

As described in detail below, the portable electronic device 202 executes the occupancy sensor application 250, which is capable of receiving and processing occupancy data (for example, as received from the occupancy sensor 102), and displaying the data via a graphical user interface on the display 235.

In some embodiments, the portable electronic device 202 is a smart telephone. In other embodiments, the portable electronic device 202 may be a tablet computer, a smart watch, a laptop computer, a combination of the foregoing, or another portable or mobile electronic device containing software and hardware enabling it to operate as described herein.

As noted above, the occupancy sensor 102 includes an LED 135, which can indicate when an occupancy event occurs. This may be used by a technician to tune the performance of the occupancy sensor 102. For example, the technician may adjust the occupancy threshold based on when the LED 135 illuminates. This approach is limited, however. For example, the LED 135 can only be observed by an installer in the same room as the occupancy sensor 102 and the IR energy produced by the installer may artificially alter the IR background signature of the room. In addition, the LED 135 provides only a binary indicator of the occupancy state. In the case where a room is actually occupied, but occupancy is not detected, it may be useful to know the occupancy data relative to the current threshold. Likewise, when occupancy is detected, it may be useful to know by how much the occupancy threshold is exceeded. However, without access to the underlying data from the occupancy sensor 102, determining proper operation of the occupancy sensor 102 is left to uninformed trial and error.

Figure 2:
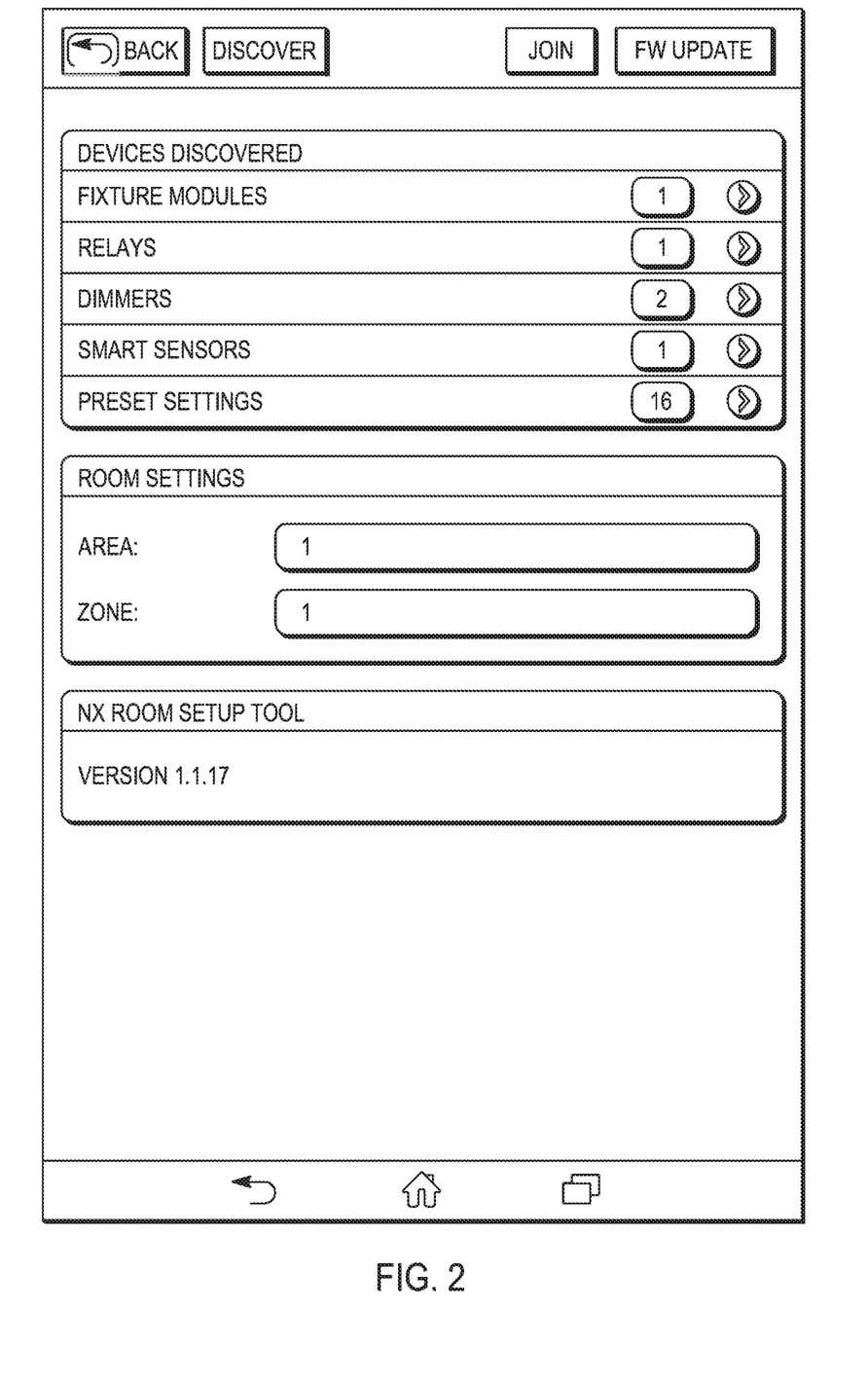
FIG. 2 illustrates a graphical user interface for discovering lighting control devices, according to some embodiments.

Accordingly, the portable electronic device 202 includes an occupancy sensor application 250. The occupancy sensor application 250 is a software application (or "app"), which receives and processes sensor data from the occupancy sensor 102, and presents such data to one or more users of the portable electronic device 202. In some embodiments, the application includes a device discovery mode. For example, as illustrated in FIG. 2, the application discovers, among other things, fixture modules, relays, dimmers, and smart sensors (for example, the occupancy sensor 102) that are connected wirelessly to the portable electronic device 202. In some embodiments, the discovery mode is done based on a particular room (for example, as defined by an area and zone assignment).

Figure 3:
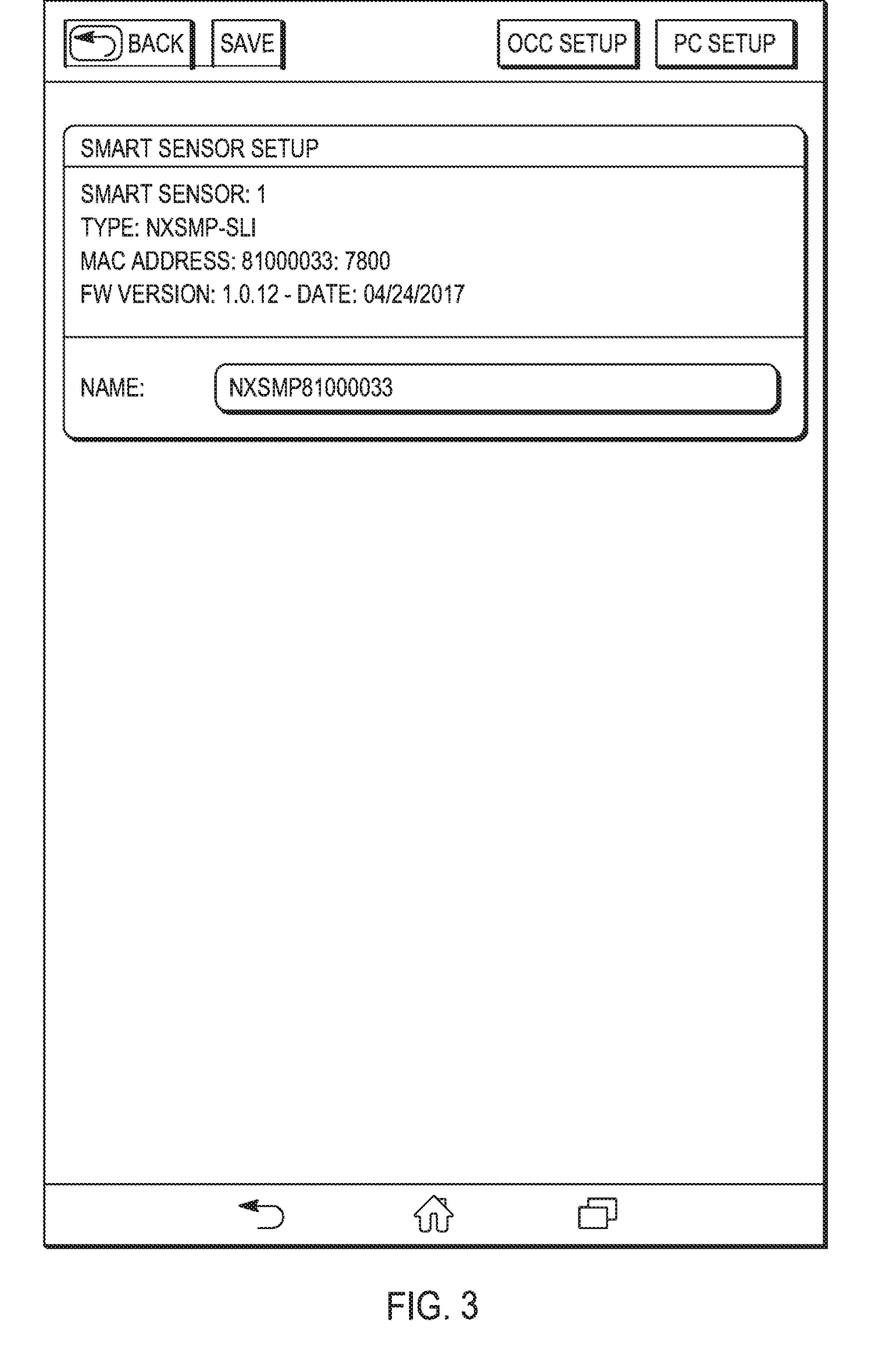
FIG. 3 illustrates a graphical user interface for setting up a smart sensor, according to some embodiments.
Figure 4:
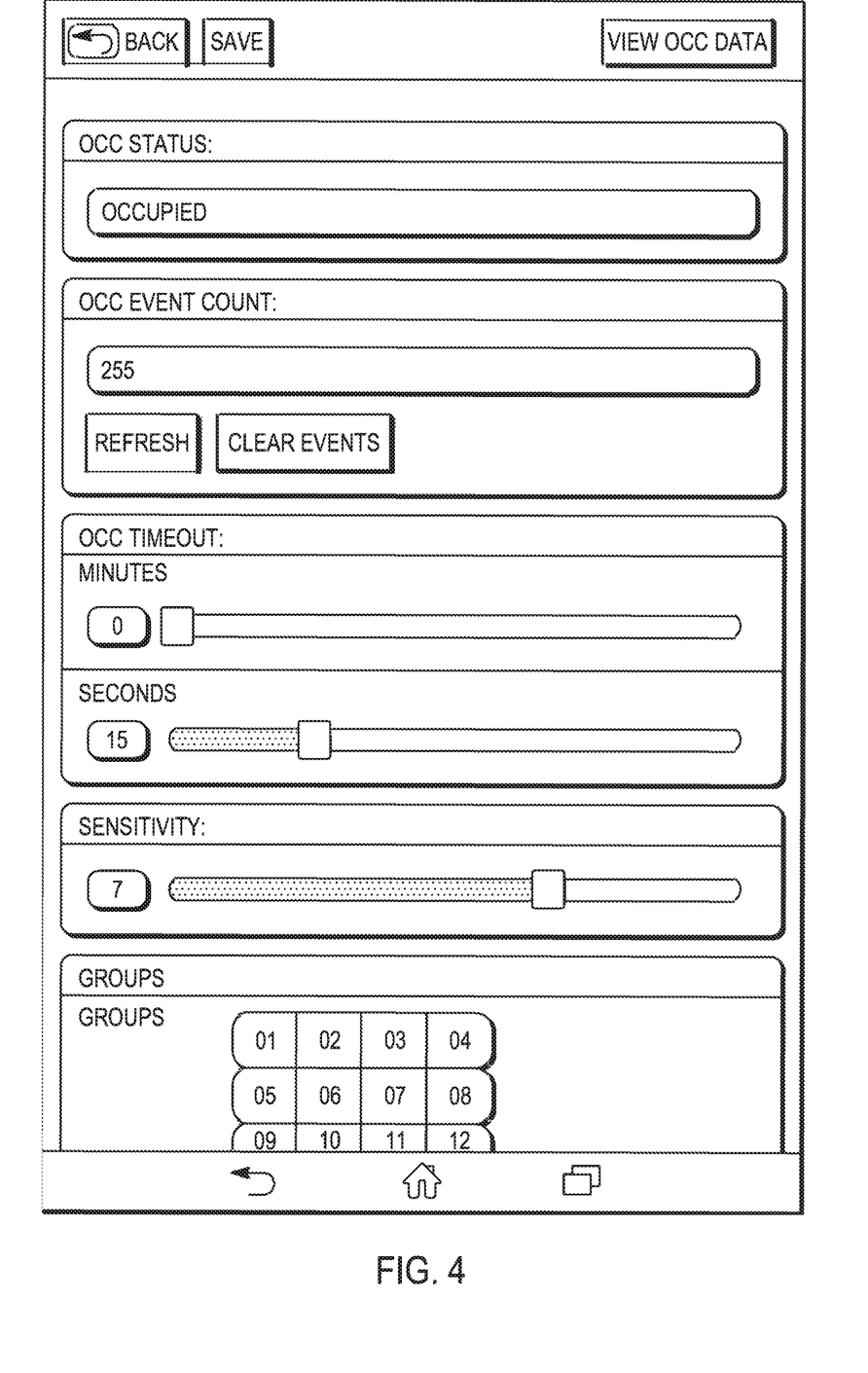
FIG. 4 illustrates a graphical user interface for configuring an occupancy sensor, according to some embodiments.

In the example embodiment illustrated, a single smart sensor has been discovered. Selecting "Smart Sensors," takes the user to a setup screen for the discovered smart sensor, as illustrated in FIG. 3. In some embodiments, the setup screen displays information about the sensor type, network address, firmware revision, and the name of the smart sensor. In some embodiments, the user is allowed to change the name of the smart sensor. The setup screen also provides an "Occ Setup" button, the selection of which takes the user to an occupancy sensor control page. An example occupancy sensor control page is illustrated in FIG. 4. The sensor control page displays sensor status and parameters for the occupancy sensor 102. For example, the occupancy status (e.g., "Occupied" or "Unoccupied"), the occupancy event count (i.e., how many occupancy events have occurred), the occupancy timeout, and the occupancy threshold (shown as "Sensitivity" in the example). In some embodiments, the sensor control page allows a user to view or configure the areas, groups, or zones to which the occupancy sensor 102 belongs (or will share occupancy event data).

The application is configured to receive user inputs, for example, from the sensor control page, corresponding to updated values for the occupancy threshold and the occupancy timer. When updated values are received for these parameters, the application transmits those values to the occupancy sensor 102. The occupancy sensor 102 receives the new values and uses them to control when it determines an occupancy event and when it indicates an "Occupied" status. In some embodiments, the application utilizes machine learning neural networks) to analyze occupancy data and user inputs to automatically determine updated values for the occupancy threshold and the occupancy timer.

The example sensor control page also includes a. "View Occ Data" button, which displays a live graph of the occupancy data from the occupancy sensor 102. In some embodiments, the application allows a user to view historical occupancy data. Occupancy data shows the effect of motion in the controlled area and can be used to detect elevated noise floor, which can cause insensitivity. FIGS. 5 through 10 illustrate example graphical representations of live or historical occupancy data from the occupancy sensor 102. The electronic processor 205 generates the graphical representations using occupancy data received from the occupancy sensor 102. When updated values are received for the occupancy threshold and the occupancy timer, as set forth above, the electronic processor 205 generates updated graphical representations using those values.

FIGS. 5 through 10 illustrate example graphical representations of live or historical occupancy data. As an example, FIG. 5 includes live motion detection data (referred to as "Sliding Window Data") illustrated as a line graph 450. As noted above, motion is detected by monitoring changes in infrared energy in the field of view of the PIR sensor 110, which changes the PIR sensor 110 outputs as a voltage. The voltage levels are sampled periodically by the microcontroller 105 to produce the motion detection data. The double dash line 460 represents the occupancy threshold. The occupancy threshold shows the event detection level relative to the occupancy data (i.e., the voltage level above which the microcontroller 105 will record an occupancy event). The dashed line 470 represents the occurrence of an occupancy event. Occupancy events show the decision process of the microcontroller, indicating its sensitivity to the occupancy data. The solid line 480 represents the occupancy state (i.e., whether the occupancy sensor 102 is reading "Occupied" or "Unoccupied"). The occupancy state (i.e., the occupancy timer) shows how much the timer is used to smooth out intermittent unoccupied events (when the data drops below the occupancy threshold). The occupancy timer can be tuned to the shortest timeout that will mask these transitions and therefore turn the lights off as quickly as possible without compromising the user's need for a lighted space. Turning the lights of as quickly as possible saves the most amount of energy.

Figure 5:
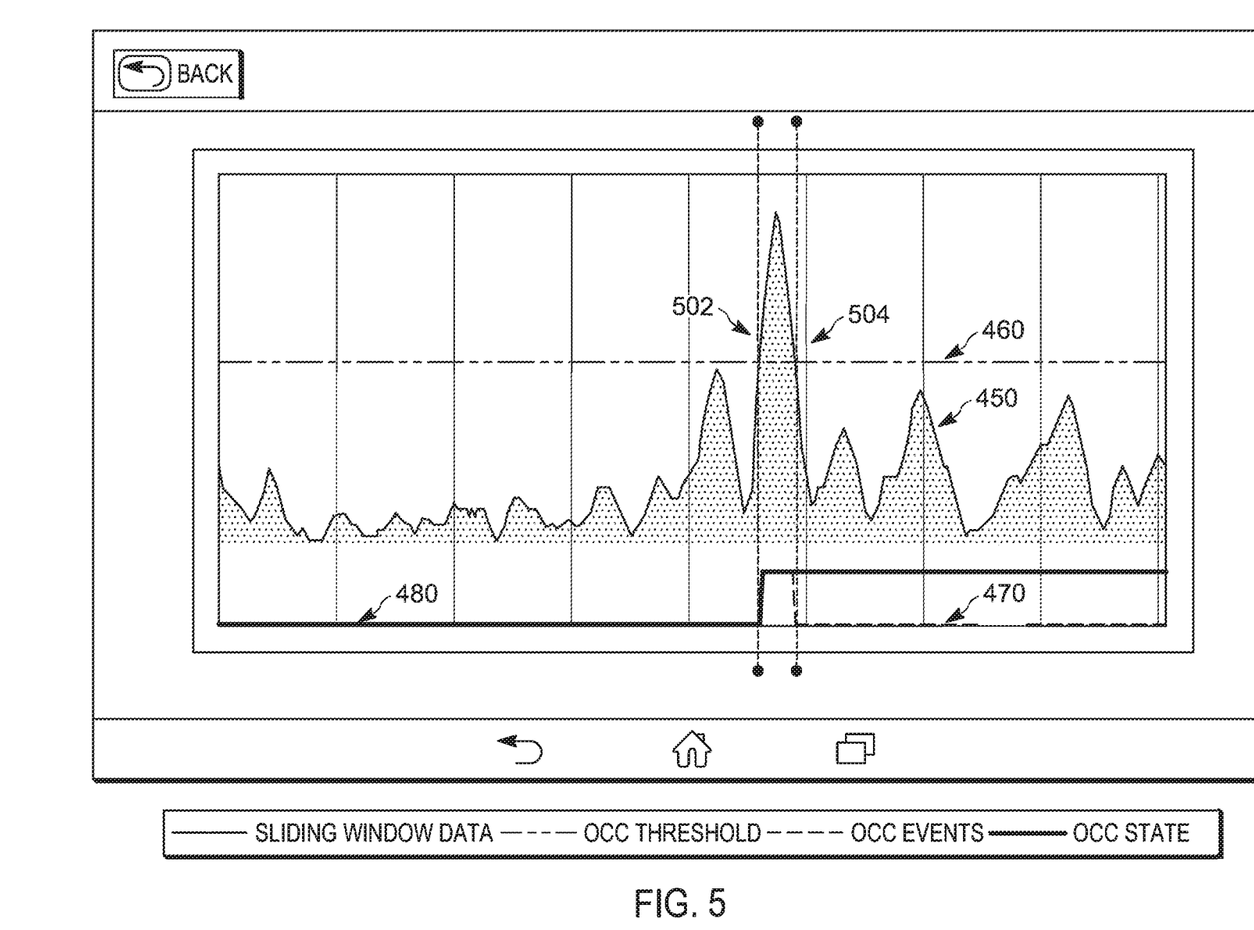
FIGS. 5 through 10 illustrate occupancy sensor data graphs, according to some embodiments.
Figure 6:
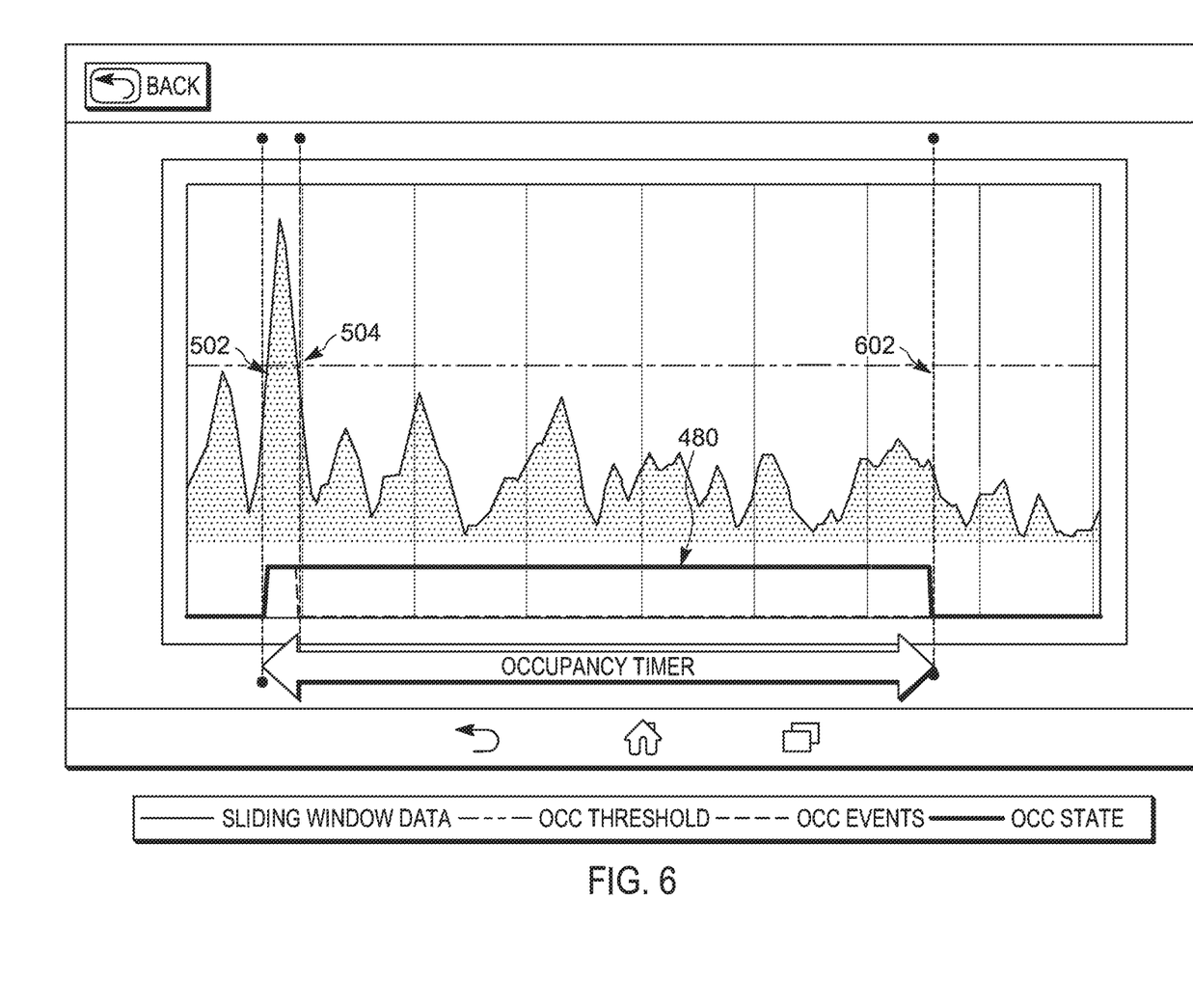

FIG. 5 illustrates the occupancy data exceeding the threshold at point 502. This causes an occupancy event, represented by the dashed line 470 elevating while the occupancy event is occurring, that is, until the occupancy data no longer exceeds the threshold (at point 504). The occupancy timer begins running at the leading edge of the occupancy event, represented by the solid line 480 elevating at point 502. The occupancy timer continues to run (that is, the solid line 480 stays elevated) until the occupancy timer expires. For example, in FIG. 6, the solid line 480 remains elevated (occupancy state="Occupied") until the occupancy timer expires with no further occupancy events (at point 602). The distance between points 502 and 602 represents the length of the occupancy timer.

Figure 7:
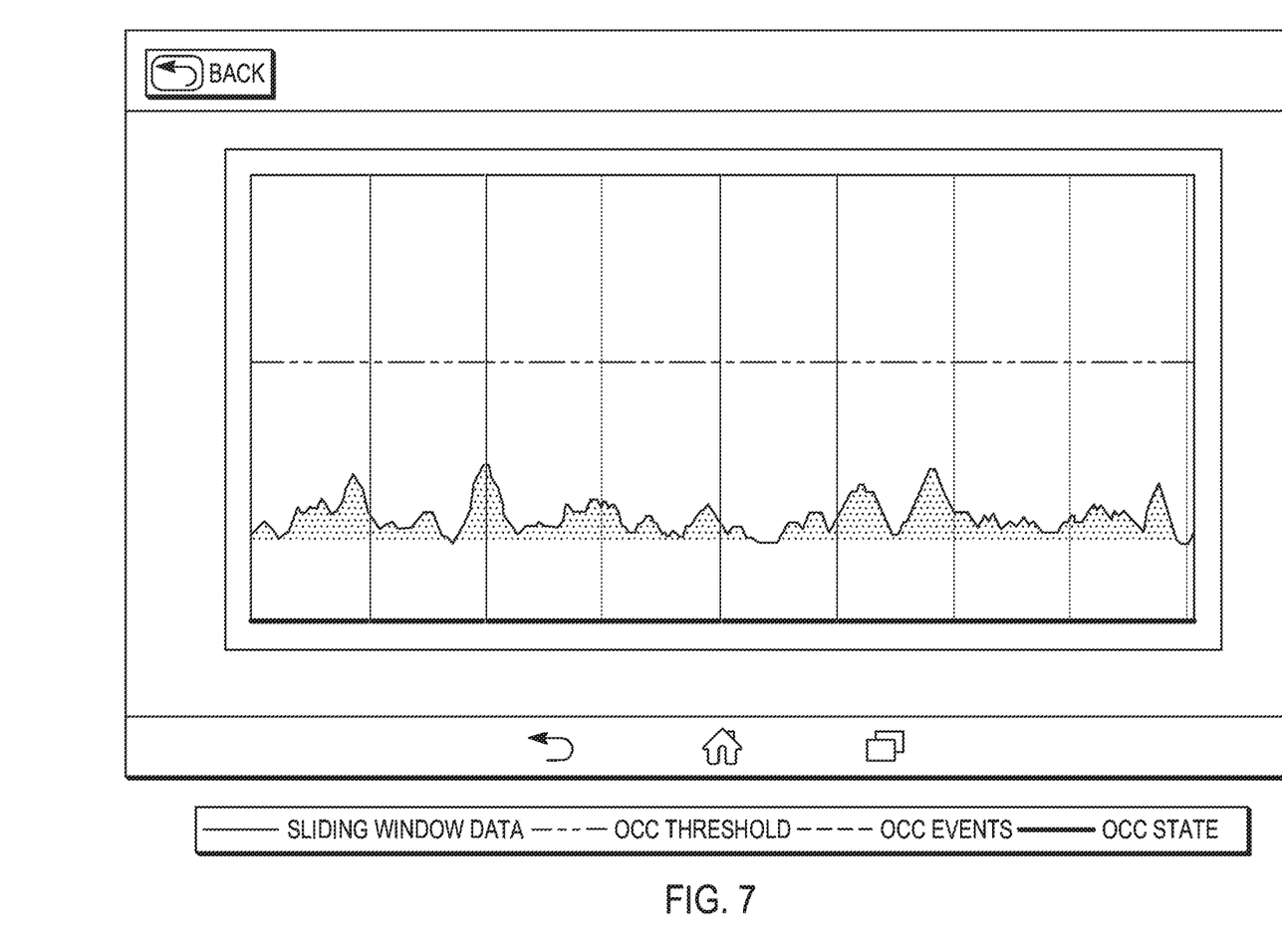

As illustrated in FIG. 7, when the occupancy data remains below the occupancy threshold, no occupancy events are posted and the occupancy timer is not started.

Figure 8:
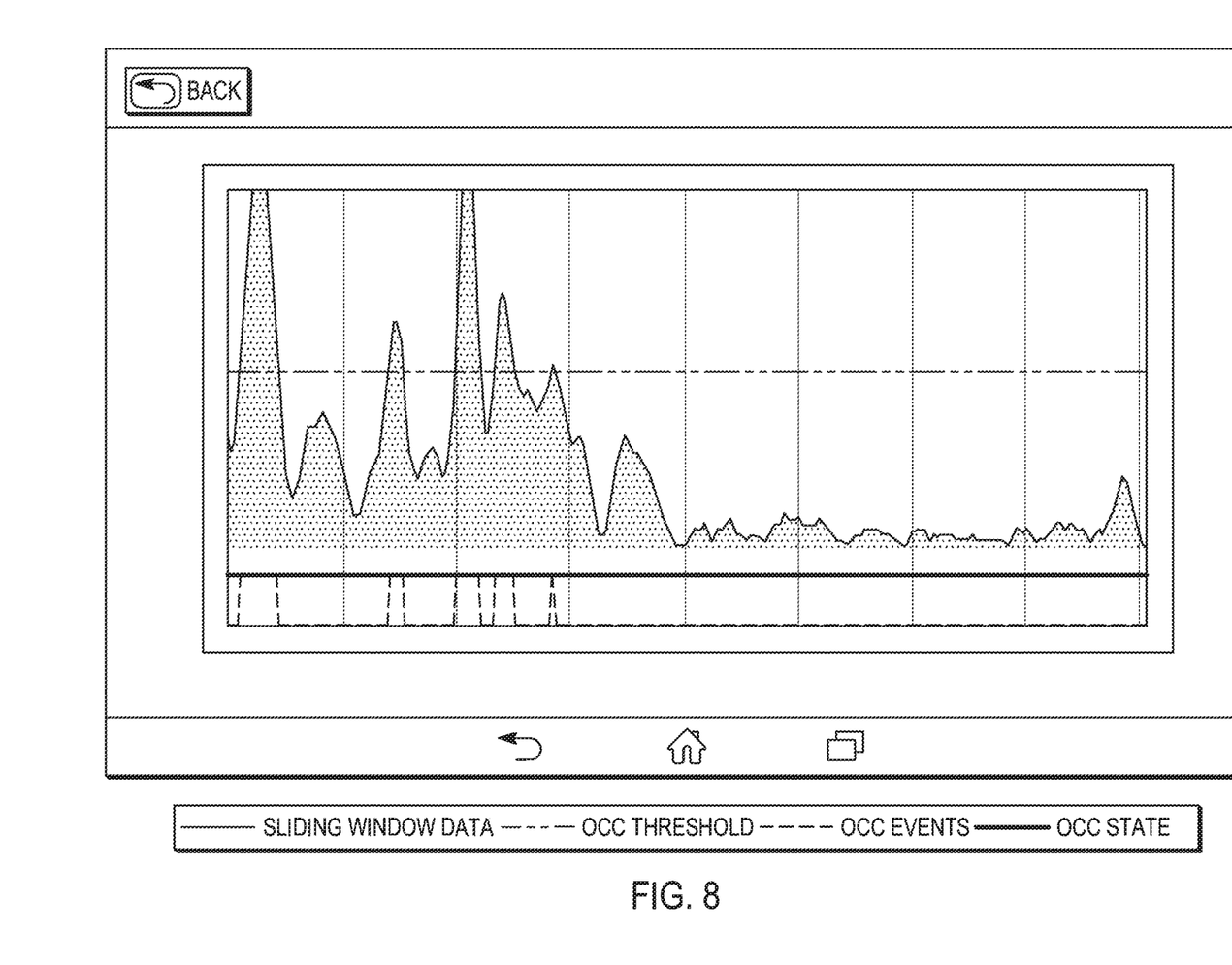
Figure 9:
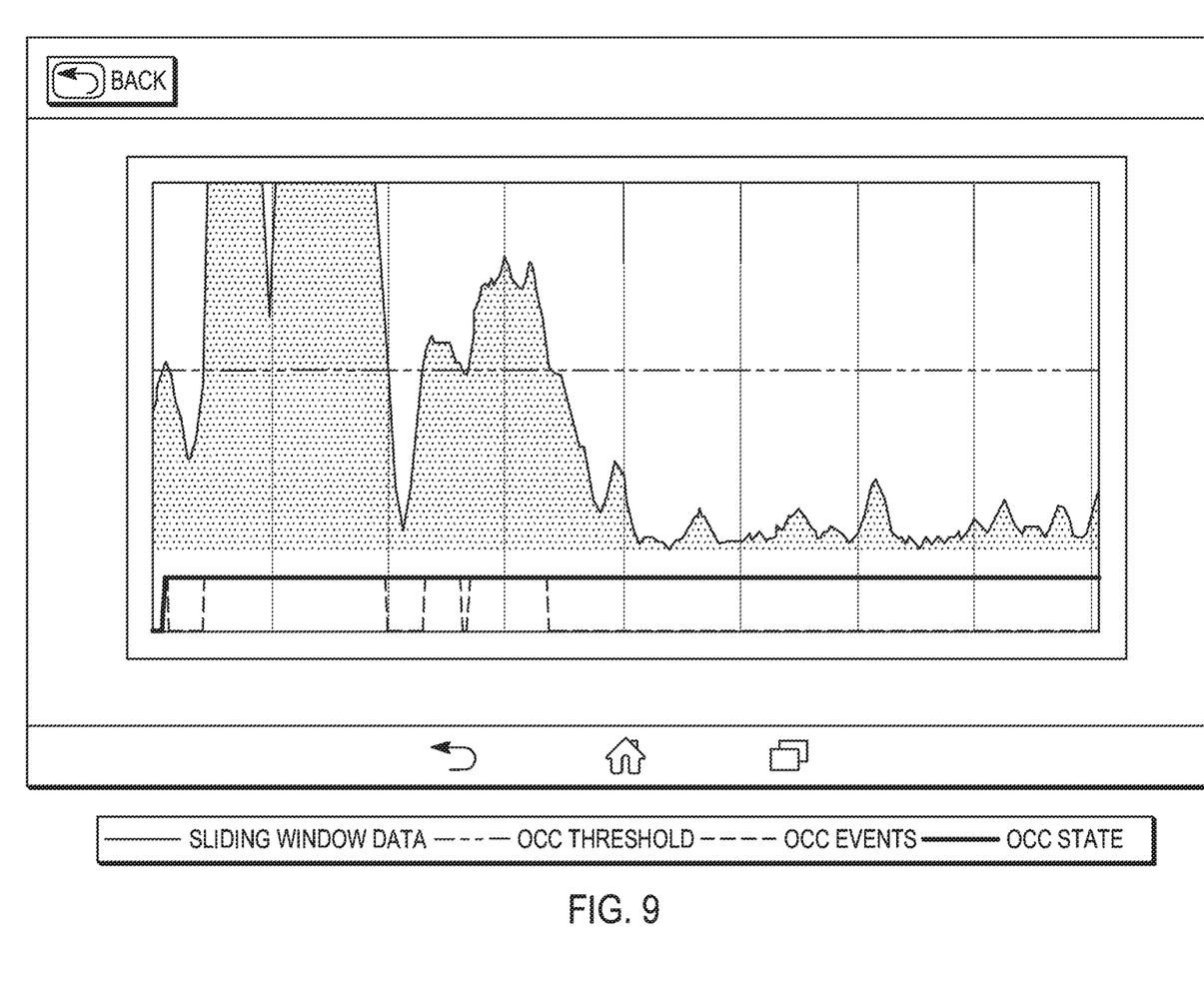

FIGS. 8 and 9 illustrate the occupancy data transitioning above and below the occupancy threshold, thereby producing several occupancy events. In the example illustrated in FIG. 8, the occupancy timer was already running due to a previous occupancy event and it continues to be restarted by each subsequent occupancy event. Although occupancy comes and goes according to the occupancy event generator, the gaps are smoothed out by the occupancy timer. Accordingly, the user sees one continuous period of occupancy and any occupancy-controlled lights relying on the occupancy sensor 102 stay on instead of flickering on and off as the occupancy data transitions. FIG. 9 illustrates a similar situation to FIG. 8, except that the start of the occupancy timer is illustrated.

Figure 10:
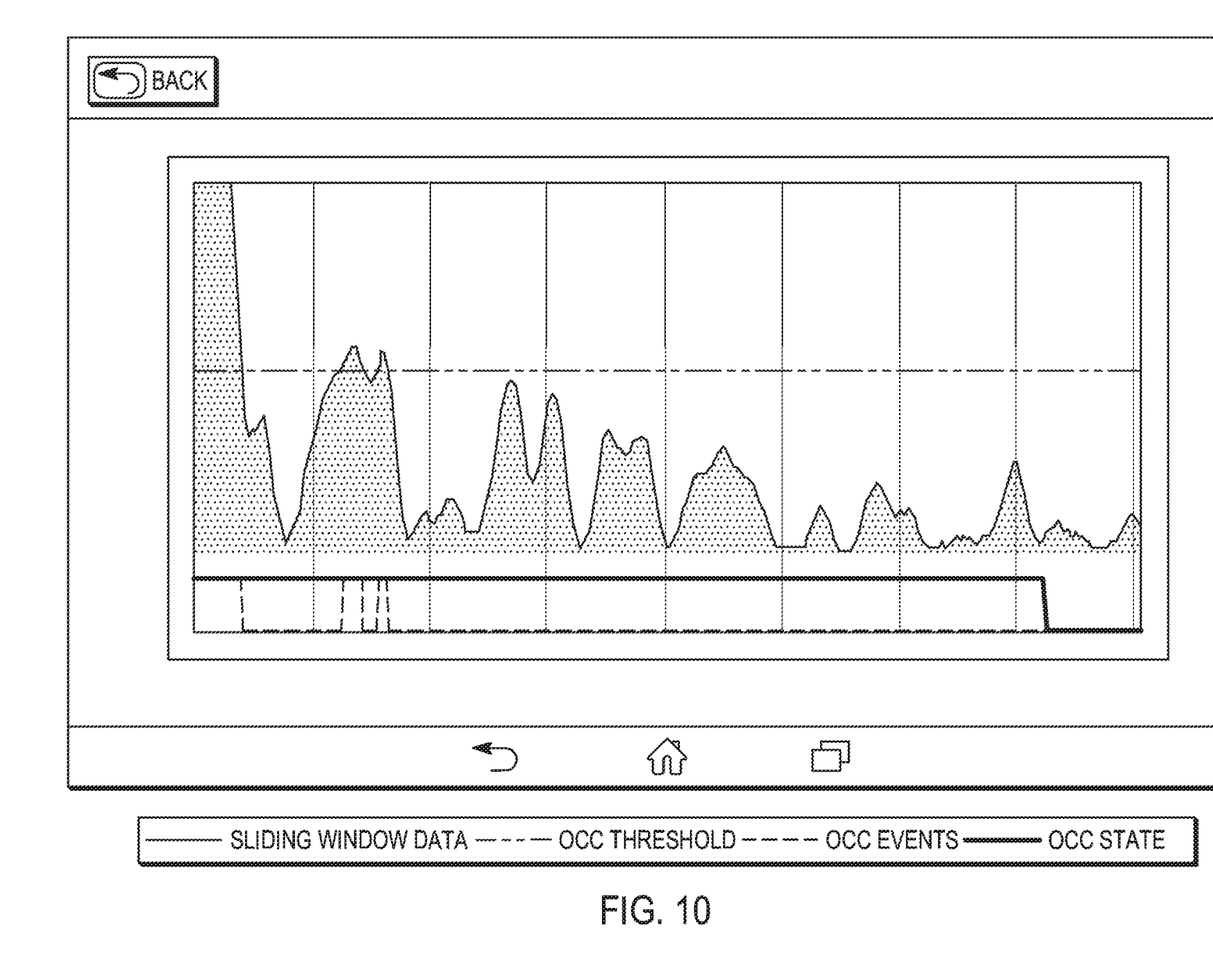

As illustrated in FIG. 10, occupancy events occur to restart the occupancy timer, but then as the occupancy data decays below the threshold and stays below it, the occupancy timer expires.

As an example, the systems and methods presented herein are described in terms of an occupancy sensor using PIR sensing technology. It should be understood that the systems and methods are also applicable to occupancy sensors equipped with ultrasonic or other sensing technologies, or combinations of sensing technologies.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A system comprising:
a transceiver;
an input/output interface;
a display; and
an electronic processor, communicatively coupled to the transceiver, the display, and input/output interface;
wherein the electronic processor is configured to
receive, via the transceiver, from an occupancy sensor, an occupancy threshold;
generate a graphical representation based on the occupancy threshold, the graphical representation including a first line providing an indication of a plurality of values relative to the occupancy threshold over time;
present the graphical representation on the display;
receive, via the input/output interface, a user input indicating an updated occupancy sensing value;
generate, based on the graphical representation and the updated occupancy sensing value, an updated graphical representation;
present, on the display, the updated graphical representation; and
transmit, via the transceiver to the occupancy sensor, the updated occupancy sensing value.

2. The system of claim 1, wherein the electronic processor is further configured to
receive a first occupancy event based on the occupancy threshold when a subset of a plurality of data points exceeds the occupancy threshold;
wherein the graphical representation is further based on the first occupancy event, and the graphical representation includes a second line providing an indication of the first occupancy event.

3. The system of claim 2, wherein the electronic processor is further configured to
determine, based on the first occupancy event, an occupancy timer;
wherein the graphical representation is further based on the occupancy timer, and the graphical representation includes a third line providing an indication of the occupancy timer.

4. The system of claim 3, wherein the electronic processor is further configured to
receive a second occupancy event based on the occupancy threshold when a second subset of the plurality of data points exceeds the occupancy threshold;
wherein the occupancy timer is further based on the second occupancy event.

5. The system of claim 1, wherein the updated occupancy sensing value is an updated value for the occupancy threshold value.

6. The system of claim 3, wherein the updated occupancy sensing value is an updated value for the occupancy timer.

7. The system of claim 1, wherein the display is a touch screen display and the user input is received via the touch screen display.

8. The system of claim 1, wherein the transceiver is a transceiver of one selected from the group consisting of a smart telephone, a smart watch, a tablet computer, and a laptop computer.

9. A method comprising:
receiving, from an occupancy sensor, an occupancy threshold;
receiving, from the occupancy sensor, a first occupancy event based on the occupancy threshold when a subset of data points exceeds the occupancy threshold;
determining, with an electronic processor, based on the first occupancy event, an occupancy timer;
generating a graphical representation based on the occupancy threshold, the first occupancy event, and the occupancy timer, the graphical representation including a first line providing an indication of a plurality of values relative to the occupancy threshold over time, a second line providing an indication of the first occupancy event, and a third line providing an indication of the occupancy timer;
presenting the graphical representation on a display communicatively coupled to the electronic processor;
receiving a user input indicating an updated occupancy sensing value;
generating, based on the graphical representation and the updated occupancy sensing value, an updated graphical representation;
presenting, on the display, the updated graphical representation; and
transmitting, to the occupancy sensor, the updated occupancy sensing value.

10. The method of claim 9, further comprising:
receiving a second occupancy event based on the occupancy threshold when a second subset of data points exceeds the occupancy threshold;
wherein the occupancy timer is further based on the second occupancy event.

11. The method of claim 9, wherein receiving a user input indicating an updated value for the occupancy sensing value includes receiving an updated occupancy threshold value.

12. The method of claim 9, wherein receiving a user input indicating an updated occupancy sensing value includes receiving an updated value for the occupancy timer.

13. The method of claim 9, wherein the steps of receiving a first occupancy event and transmitting the updated occupancy sensing value are performed using one selected from the group consisting of a smart telephone, a smart watch, a tablet computer, and a laptop computer.

14. The method of claim 9, wherein presenting the graphical representation on a display includes presenting the graphical representation on a touch screen display, and receiving a user input includes receiving a user input via the touch screen display.

15. A non-transitory computer-readable medium including instructions executable by an electronic processor to perform a set of functions, the set of functions comprising:

receiving, from an occupancy sensor, an occupancy threshold;

receiving, from the occupancy sensor, a first occupancy event based on the occupancy threshold when a subset of data points exceeds the occupancy threshold;

determining, based on the first occupancy event, an occupancy timer;

generating a graphical representation based on the occupancy threshold, the first occupancy event, and the occupancy timer, the graphical representation including a first line providing an indication of a plurality of values relative to the occupancy threshold over time, a second line providing an indication of the first occupancy event, and a third line providing an indication of the occupancy timer;

presenting the graphical representation on a display communicatively coupled to the electronic processor;

receiving a user input indicating an updated occupancy sensing value;

generating, based on the graphical representation and the updated occupancy sensing value, an updated graphical representation;

presenting, on the display, the updated graphical representation; and transmitting, to the occupancy sensor, the updated occupancy sensing value.

16. The non-transitory computer-readable medium of claim 15, wherein the set of functions further comprise:

receiving a second occupancy event based on the occupancy threshold when a second subset of data points exceeds the occupancy threshold;

wherein the occupancy timer is further based on the second occupancy event.

* * * * *